(12) United States Patent
Grateau et al.

(10) Patent No.: US 8,918,454 B2
(45) Date of Patent: *Dec. 23, 2014

(54) MANAGING RULE SETS AS WEB SERVICES

(71) Applicant: International Business Machines Corporation, Armonk, NY (US)

(72) Inventors: Laurent Grateau, Gentilly (FR); Nicolas Peulvast, Gentilly (FR)

(73) Assignee: International Business Machines Corporation, Armonk, NY (US)

( * ) Notice: Subject to any disclaimer, the term of this patent is extended or adjusted under 35 U.S.C. 154(b) by 27 days.

This patent is subject to a terminal disclaimer.

(21) Appl. No.: 13/751,766

(22) Filed: Jan. 28, 2013

(65) Prior Publication Data

US 2013/0138704 A1 May 30, 2013

Related U.S. Application Data

(63) Continuation of application No. 12/819,769, filed on Jun. 21, 2010, now Pat. No. 8,380,785.

(30) Foreign Application Priority Data

Jun. 4, 2010 (EP) .................................... 10305602

(51) Int. Cl.
G06F 15/16 (2006.01)
G06F 17/30 (2006.01)
H04L 29/08 (2006.01)

(52) U.S. Cl.
CPC .......... *G06F 17/30082* (2013.01); *H04L 67/02* (2013.01)
USPC ............................. 709/203; 707/694; 707/781

(58) Field of Classification Search
USPC ................................... 709/203; 707/694, 781
See application file for complete search history.

(56) References Cited

U.S. PATENT DOCUMENTS

| 7,188,155 | B2 | 3/2007 | Flurry et al. | |
|---|---|---|---|---|
| 8,024,384 | B2 * | 9/2011 | Prabhakar et al. | ............ 707/709 |
| 2004/0139151 | A1 | 7/2004 | Flurry et al. | |
| 2004/0205597 | A1 | 10/2004 | Abjanic | |
| 2005/0154735 | A1 | 7/2005 | Breh et al. | |
| 2005/0172000 | A1 * | 8/2005 | Nakamura et al. | ............ 709/203 |
| 2006/0095274 | A1 | 5/2006 | Phillips et al. | |
| 2009/0292766 | A1 | 11/2009 | Morris | |
| 2010/0146396 | A1 * | 6/2010 | Able et al. | ..................... 715/735 |
| 2011/0191414 | A1 | 8/2011 | Ma et al. | |

\* cited by examiner

*Primary Examiner* — Abdullahi Salad
(74) *Attorney, Agent, or Firm* — Cuenot, Forsythe & Kim, LLC

(57) ABSTRACT

Rule sets are managed as a web service. A web service request having at least a body and an endpoint address is received from a client. The endpoint address includes a service description parameter and a parameter identifying a path to a given rule set in a rule set. The body of the web service request is parsed to determine whether the body identifies a first type of method or a second type of method. If a first type of method is identified, a service description file is dynamically generated in a format specified by the service description parameter in the web service request. The service description file is based on the rule set path, information from the rule set database and model data. If a second type of method is identified, the identified rule set is executed. The first type of method may be a GET method while the second type of method may be a POST method.

18 Claims, 6 Drawing Sheets

| Header (30) | Body (32) | URL (34) | RULESETPATH (341) | OPTIONS (342) |

Fig. 3

Web Service Details

Target Namespace: http://www.ilog.com/rules/DecisionService
Description: This ruleset validates and then computes the eligibility for a given loan requested by a given borrower.
Location: http://parrules04-2k8.ilog.biz:1234/ILOGRuleExecutionService/htdsservice.svc/htds/MiniLoanTestingRuleApp/1.0/MiniLoanTestingRules
Protocol: SOAP
Transport protocol: SOAP over HTTP
Operation: ExecuteDecisionService Style: document
Operation Type: *Request-response.* The endpoint receives a message, and sends a correlated message.
SOAP Action: ExecuteDecisionService
DecisionServiceSoapRequest (soap:body,use=literal) <u>Source code</u>

Input:
- parameters type DecisionServiceRequest
  - ▣ILOG.Rules.TraceFilter type TraceFilter
    - ☐TotalExecutedRules type *boolean*
      Records the number of rules executed.
    - ☐TotalExecutedTasks type *boolean*
      Records the number of tasks executed should be recorded
    - ☐ExecutedRules type *boolean*
      Records what rules have been executed
    - ☐ExecutedTasks type *boolean*
      Records what tasks have been executed
    - ☐TotalNotExecutedRules type *boolean*
      Records the number of rules that have not been executed
    - ☐Total Not Executed Tasks type *boolean*
      Records the number of tasks that have not been executed
    - ☐NotExecutedRules type *boolean*
      Records what rules that have not been executed
    - ☐NotExecutedTasks type *boolean*
      Records what tasks that have not been executed
    - ☐ExecutionDuration type *boolean*
      Records the duration of execution
    - ☐WorkingMemory type *boolean*
      Records the state of the working memory
    - ☐InputParameters type *boolean*
      Records ruleset input parameters

Fig. 5

DecisionServiceSoapResponse(soap:body,use=literal *Source code*

Output:

parameters type DecisionServiceResponse

☐ILOG.Rules.FiredRulesCount type *int*
☐ILOG.Rules.RulesetPath type *string*
☐ILOG.Rules.ExecutionTrace type *ExecutionTrace*
    Provides information concerning the result of a ruleset execution
        ☐RuleSetPath - optional; type string
        ☐CanonicalRuleSetPath - optional; type *string*
        ☐Rules - optional; type *Rules*
            Represents a list of rules.
                ☐RuleInfo - optional, unbounded; type *RuleInfo*
                    Represents a single rule.
                        ☐Uuid type *string*
                        ☐Package type *string*
                        ☐Name type *string*
                        ☐DecisionTable-optional; type *boolean*
        ☐Tasks-optional; type *Tasks*
            Represents a list of tasks
                ☐Ruleflow Info-optional, unbounded; type *RuleFlow Info*
                      ☐Uuid type *string*
                      ☐Name type *string*
                      ☐Package type *string*
                      ☐TaskInfos - optional; type *TaskInfos*
                          ☐TaskInfo - optional, unbounded; type *TaskInfo*
                              Represents a single task
                              ☐Name type *string*
    ☐ExecutionServerInfo - optional; type *ExecutionServerInfo*
        Provides information about the execution server.
            ☐UserName type *string*
            ☐HostName type *string*
            ☐IPAddress type *string*
    ☐InputParameters - optional; type *Parameters*
        Represents a list of parameters.
            ☐Parameter - optional, unbounded; type *Parameter*
                Represents a named object parameter

MANAGING RULE SETS AS WEB SERVICES

CROSS-REFERENCE TO RELATED APPLICATIONS

This application is a Continuation of U.S. application Ser. No. 12/819,769, filed on Jun. 21, 2010.

BACKGROUND

This invention generally relates to data processing systems, and in particular to managing rule sets as web services.

Data processing systems provide facilities to organize and manage large amounts of information. These data processing systems are generally programmed to implement the business processes of a particular enterprise.

In the business field, there is a particular need to acquire and manage large amounts of information for decision making, planning, and operating the business. Each enterprise implements business processes for collecting and managing the information required for that particular enterprise.

Rule management systems provide decision automation based on rule processing. Such systems provide decisions based on testing conditions and can also be used to confirm compliance with a set of rules. More generally, decision automation applies to an activity, a process or a transaction requiring the application of rules or criteria to obtain a result.

Rules are a convenient way to represent decision-making policies. A rule consists of a condition which comprises a combination of tests and actions, which can consist of a sequence of elementary steps.

Existing rule management systems handle the data elements involved in an activity, process or transaction as objects containing attributes. The system creates an object probe from the object where the probe contains a subset of the attributes of the object. The object probe may be passed to a rule to check if the object probe satisfies the conditions of the rule. If the object probe does satisfy the conditions of the rule, a system action can be taken accordingly.

Rules management systems such as Business Rule Management Systems (BRMS) are generally used by business analysts to describe and execute their own rules easily without the help of developers. Conventional BRMS provide one or more servers known as rule execution servers that enable clients to deploy sets of rules and use them at a single endpoint. At a given single endpoint, any rule set can be executed, regardless of its path. The first time a rule set is called, it is instantiated in a pool of rule sets from which it is reused by subsequent requests. Therefore, rule sets do not have to be read and interpreted at each call. This increases the number of transaction per seconds. Generally, this pool of rule sets provides various client Application Programming Interfaces (APIs) to execute a set of data in a rule set.

The current solution for providing rule-based decision services is to add code directly to the execution server in order to provide an interface to the client to enable deployment at a different endpoint address. However, in such static solution, code has to be changed each time the model changes and at each phase of the development: authoring, testing, and production. Accordingly, these rule-based decision services are usually hard-coded by the development team, making them difficult to update and reuse.

In addition, if the decision service is distributed over multiple execution servers in order to provide high availability, the code for the decision must be manually copied, maintained, and kept in synchronization across all servers on which the code is located.

The execution servers themselves may not be of a uniform type, requiring the user to handle each individual case of deployment and management according to the requirements of each system. As a result of the foregoing, creating, developing, and maintaining rule-based decision services can impose a high cost on an organization at all points in the service life-cycle.

SUMMARY

The invention may be implemented as a method for managing rule sets based on a given model. A web service request received from a client includes a body and an endpoint address. The endpoint address includes a service description parameter and a rule set parameter identifying a path to a given rule set in a rule set database. The body of the web service request is parsed to determine if it identifies a first method type or a second method type. If the first method type is identified, a service description file is dynamically generated in the format specified by the service description parameter. The service description file is based on the rule set parameter, information maintained in the rule set database and model data. If the second method type is identified, the rule set identified by the rule set parameter is executed.

The invention may also be implemented as a computer program product having a computer-readable medium embodying program instructions. When loaded into and executed by a computer, the program instructions cause the computer to manage rule sets based on a given model. The program instructions include program instructions configured to receive a web service request from a client where the request includes a body and an endpoint address that includes a service description parameter and a rule set path parameter identifying a path to a given rule set in a rule set database. Program instructions are configured to parse the body of the web service request to determine whether a first method type or a second method type is identified. If a first method type is identified, program instructions are configured to dynamically generate a service description file in the format specified by the service description parameter. The service description file is based on the rule set parameter, information maintained in the rule set database and model data. If the second method type is identified, program instructions are configured to execute the rule set identified by the rule set parameter.

The invention may also be implemented as an execution server for managing rule sets. A request router receives a web service request from a client. The web service request includes a body and an endpoint address. The endpoint address includes a service description parameter and a rule set parameter identifying a path to a given rule set in a rule set database. A request processor parses the body of the web service request to determine if it identifies a first method type or a second method type. If the first method type is identified, a web service description generator dynamically generates a service description file in the format specified by the service description parameter. The service description file is based on the rule set parameter, information maintained in the rule set database and model data. If the second method type is identified, a rule execution engine executes the rule set identified by the rule set.

BRIEF DESCRIPTION OF THE SEVERAL VIEWS OF THE DRAWINGS

FIG. 3 schematically illustrates the structure of a web service request according to certain embodiments of the invention.

FIGS. 5 and 6 are examples of a web service description in HTML format.

DETAILED DESCRIPTION

Figure 1:
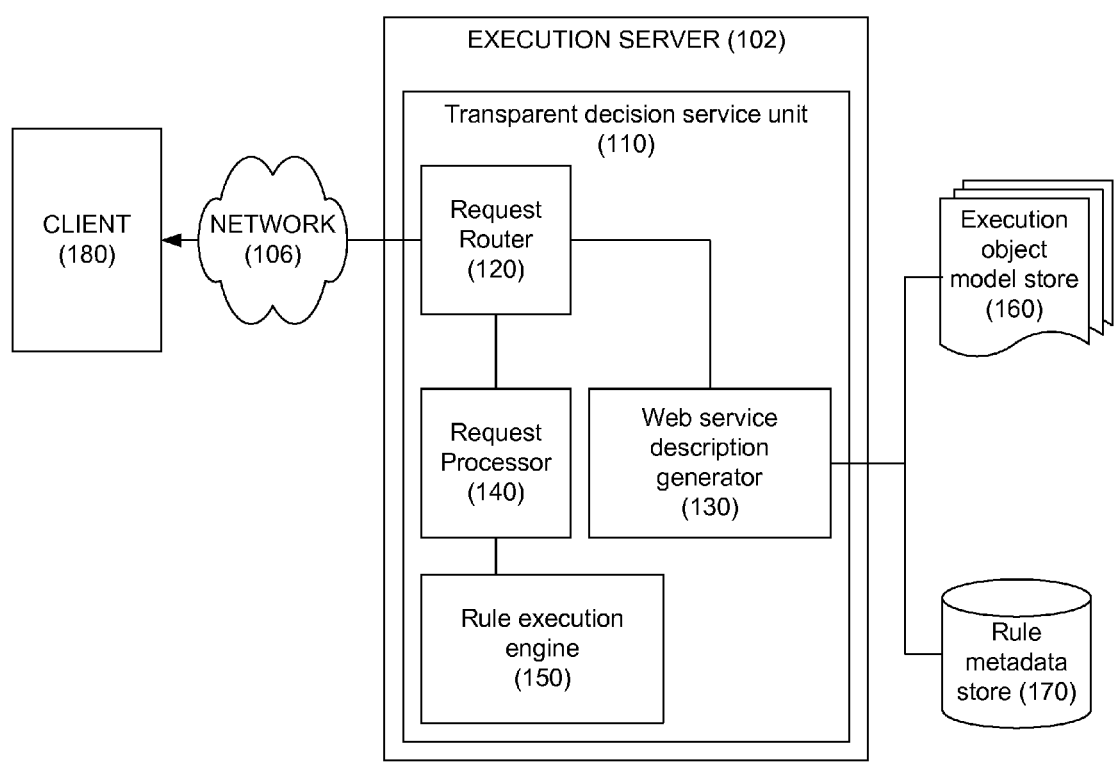
FIG. 1 shows an exemplary hardware architecture implementing a rule set management system according to certain embodiments of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium having computer-usable program code stored in the medium.

Any combination of one or more computer usable or computer readable storage medium(s) may be utilized. The computer usable or computer readable storage medium may be, for example but not limited to, an electronic, magnetic, optical, electromagnetic, infrared, or semiconductor system, apparatus, or device. More specific examples (a non-exhaustive list) of computer usable mediums would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer usable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The computer program code may execute entirely on a user's computer as a stand-alone software package or as an integrated component of a larger software package, partly on the user's computer and partly on a remote computer or entirely on remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The following description will indicate where specific program code is or can be executed in a network of computer devices.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 shows an exemplary hardware architecture implementing a rule management system 100 according to certain embodiments of the invention.

The rule management system 100 (hereinafter referred to as a "transparent decision service") exposes rule sets as a web service. It provides transparent decision services and allows the decision logic to be externalized so that it can be owned and maintained by business experts and managed by the development team once it is ready to be deployed into production.

The transparent decision service system 100 is adapted to drive rule execution and to enable clients to access a rule execution server 102 through a web-service, rather than accessing it directly. The system 100 is referred to as a transparent decision service because any user can edit from an interface, deploy and execute a decision service without any help of an expert developer. The client users do not need to know how the service is implemented and can access it through any suitable data format, including HTTP and XML data formats.

Rules relating to a given decision are organized for execution and stored in a rule set. A rule set is a standalone, executable container that corresponds to a decision. A rule set comprises a set of rules and rule information that are to be executed by a rule execution engine 150.

The system 100 further comprises a rule database 170, referred to thereinafter as a rule metadata store, for storing rule sets according to a given schema, such as an XSD schema, in a suitable computer memory device.

The execution server 102 hosts the transparent decision service. The execution server 102 interacts with a web service client 180 over a network 106, exchanging information with the client using protocols suitable for web services. Examples of currently known suitable web service protocols include SOAP, REST, HTTP/XML, and JSON. Network 106 is not limited to a particular type of network. Examples of suitable types of networks include the Internet, proprietary Wide Area Networks (WANs) or Local Area Networks (LANs)

The client 180 may communicate web service requests to the execution server 102 in any suitable scripting language providing a model for describing web services such as WSDL (Web Service Description Language). For illustrative purposes only, the following description will be made with reference to web service requests in WSDL format in combination with the SOAP protocol for exchanges between the server and the client. An application running in client 180 connecting to a web decision service can read the WSDL model to determine what operations are available on the server. The client 180 can then use SOAP protocol to actually call one of the operations listed in the WSDL file. A WSDL file represents an XML document that describes a Web service. It specifies the location of the service and the operations (methods) the service exposes, such as GET or POST.

The transparent decision service system 100 may be used in a deployment phase to help development teams deploy business rules as fully formed services and integrate them into an appropriate service architecture platform, such as a Service Oriented Architecture (SOA) platform. The web service requests from the client 180 may be emitted by a client user or by an application that needs to make a decision.

The transparent decision service system 100 may be further used in a subsequent execution phase. During the execution phase, when the client user or the client application at the client side needs to make a decision, it may access the decision service using the web service description to specify which rule set is to be executed using a web service request in a similar format as in the deployment phase. The execution server 102 is adapted to process the request, execute the specified rule set and return the appropriate decision or value.

It should be noted that although FIG. 1 shows only one server 102 and one client 180, implementations of the present invention can support any number of servers and client computers connected via network 106.

Execution server 102 includes a transparent decision service unit 110 for dynamically generating a web service to the client 180. More specifically, depending on the web service request received from the client, the transparent decision service unit 110 can generate a web service description using a WSDL format, or alternatively a human readable format, based on rule data from the rule set data store 170 and on model data from an execution object model store 160. The web service description file represents the model of the web service. This allows the client to dynamically construct code for subsequently invoking the rule set execution. After the client has received the web service description, the transparent decision service unit 110 can further generate the code in any suitable format (Java, .Net, etc.) that will allow the client to call the execution of a rule set in response to another client request.

The transparent decision service unit 110 comprises a request router 120 operatively coupled to the client 180 for receiving the web service requests from the client 180 and parsing the endpoint address of the web service request to dispatch request information to a request processor 140 and/or a dynamic web service description generator 130. The request processor 140 is used to process the web service request. The dynamic web service description generator 130 generates a web service description file in a WSDL format or, alternatively, a human-readable format. The web service description file describes the operations that the web service supports and the response types of these operations. The web description file, whether in WDSL format or in human readable format, is dynamically generated based on the web service request, from rule data in the rule metadata store 170 and model data in the execution object model store 160.

The rule metadata store 170 maintains sets of rules referred to as "rule sets". The execution object model store 160 comprises data types (e.g. classes) attached to the "rule sets" stored in the rule metadata store 170. More specifically, the execution object model store 160 stores an object model (such as an XML Object Model or XOM) representing the model against which rules are run. It references the application objects and data. The rule project associated with the rule sets may reference the object model.

For example, an object model in XOM format may be built from:
Compiled Java classes (Java Execution Object Model), and
XML Schema (Dynamic Execution Object Model).

From the object model maintained in execution object model store 160, the rule execution engine 150 can access application objects and methods, which can be, for example, Java objects, XML data, or data from other sources.

The request processor 140 parses the web service request received from the Request Router 120, serializes and de-serializes rule set parameters contained in the request, and constructs requests to the Rule Execution engine 150. The Rule Execution engine 150 executes sets of rules based on the information received from the request processor 140.

Figure 2:
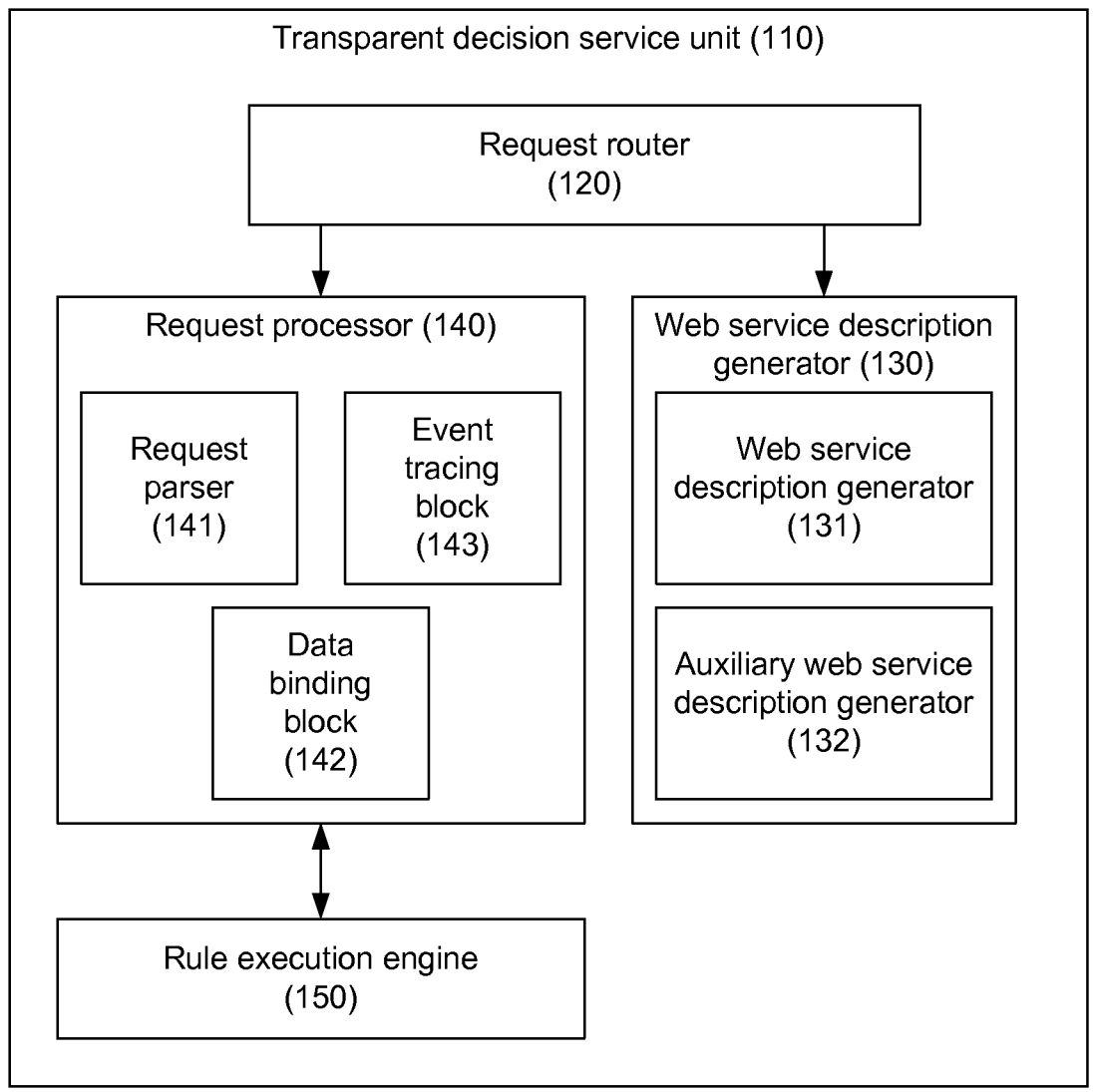
FIG. 2 shows further details of certain components of the architecture shown in FIG. 1 according to certain embodiments of the invention.

FIG. 2 shows the structure of the transparent decision service unit 110 according to certain embodiments of the invention.

As shown in FIG. 2, the dynamic web service descriptor 130 includes a WSDL description generator 131 for generating a web description file according to WSDL format and an auxiliary service description generator 132 for generating a decision service description in human readable format, according to the rule data in the rule metadata store 170 and model data in the execution object model store 160.

To generate a WSDL file, the web service description generator 131 builds a WSDL description of the web service that is dynamically created from the rule metadata store 170.

A WSDL file describes a web service in a format that is independent of the language used to generate it. For example, WSDL files may be used to generate code in Java or .NET languages, or in any language that supports the WSDL format.

A WSDL file includes a number of subsections defining a web service:
    a service section defining a web service exposed to web based protocols (e.g. HTTP, SOAP) offering endpoints for the bindings defined in the WSDL file;
    one or more Binding subsections (concrete) specifying the interface, defining the SOAP binding style (RPC/Document) and transport (SOAP Protocol) and a set of operations using an operation attribute ("<operation>") where each operation may define a SOAP action (e.g. GET, POST . . . ) or the way the message is encoded;
    a PortType or Interface subsection (abstract) describing the data using for example XML schema; and
    a port or endpoint attribute defining the address or connection point to a web service using a http URL (Uniform Resource Locator) string.

A WSDL file may further include message subsections defining operations. A message subsection may contain the information needed to perform the operation. Each message subsection may comprise a number of logical parts forming a description of the logical content of a message, each part being associated with a message-typing attribute such as:

a message name attribute that provides a unique name among all messages; and a part name attribute that provides a unique name among all the parts of the enclosing message.

Parts are a description of the logical content of a message. In RPC binding, a binding may reference the name of a part in order to specify binding-specific information about the part.

Message subsections may be replaced with a direct reference to XML schema types for defining bodies of inputs, outputs and faults.

The web service description generator 131 also defines the request and response XML type definitions for each operation. This is done by mapping the objects and the object hierarchy in the object model, into XML types, using any suitable language such as XML Schema Definition (XSD) language.

Referring back to FIG. 1, the request processor 140 includes a request parser 141 for translating the web service requests into a rule set execution message, a data binding block 142 that serializes/de-serializes the message to class instances, and an event trace block 143 for monitoring rule execution and building the trace results.

The Request Parser 141 is provided to extract data, e.g. XML data, from a web service request received from the client.

The data binding block 142 is provided to construct objects that can be interpreted by the rule execution engine 150 based on the data extracted by the request parser 141.

In accordance with the invention, the client may specify the activation of execution tracing in the request sent to generate the web service description. When trace execution is enabled, execution tracing information will be added to the web service description so that the rule set execution will return trace information. Tracing information may include any information related to the operation of the rule execution engine 150, for example, information about the number of tasks that have been executed, the number of rules that were executed/not executed, the events that took place in the working memory, the version of the rule set that was executed, etc.

The event tracing block 143 is used to trace events related to the rule execution engine when the execution tracing option has been enabled.

In accordance with embodiments of the invention, transparent decision services may be accessed using the execution server endpoint as root name in the web service request. The web services are viewed as resources and can be identified by their URLs. The Web service clients 180 needing to use these resources can access a particular representation by transferring application content using a defined set of remote methods that describe the actions to be performed on the resource (such as GET or POST actions).

The transparent decision service system 100, according to certain embodiments of the invention, provides the declaration of the decision service and the rule set path it uses, using a RULESETPATH parameter in the request. The rule execution may be traced by managing a TRACE parameter in the web request.

To be able to call a given rule set as a decision service, deployment of the rule set is required. During the deployment phase, the client deploys the rule set to the Rule Execution Server 102 for storage in the rule metadata store 170. The client also deploys an object model assembly for storage in the execution object model store 160. The object model will be used for the rule set execution during the rule set execution phase.

When the rule set and the Object Model assembly are deployed, the deployed rule set is ready to be called as a web service. The client can subsequently retrieve the WSDL file associated with this rule set and send requests for execution of the rule set using the same request format as for the deployment phase.

The transparent decision service system 100 according to embodiments of the invention operates in two modes.

In a first mode, the service description file is dynamically generated by the dynamic web service description generator 130 in the format identified in the web service request (e.g. WSDL or HTML) and based on the request endpoint address.

In a second mode, the web service is executed according to the web service protocol (e.g. SOAP) by the rule execution engine 150 based on the information received from the request processor 140.

The execution server 102 can thereby dynamically expose any deployed rule set. In response to a client request, the transparent decision service system 110 dynamically generates a web service description in WSDL format or in human-readable format for each deployed rule set. These rule sets are then exposed as Web services without any additional code deployment.

FIG. 3 illustrates the format of a web service request used in deployment and execution modes in accordance with certain embodiments of the invention.

The client 180 may access a transparent decision service from a user interface such as a rule execution server console or from a web browser.

The web service request is received from the client 180 according to any suitable transfer protocol such as HTTP. The following description will be made with reference to HTTP protocol for illustrative purpose only.

The web service request includes a body 32 which may include a HTTP request method (such as GET or POST), an endpoint address portion (also referred to as execution service address) 34 representing the URL used to contact the server (execution service address) such as an HTTP URL. It may further include a header 30.

The URL includes a rule set parameter RULESETPATH identified as 341, and OPTIONS parameter 342 including a web service description parameter (thereinafter referred to as "WSDL" parameter). The general expression of the URL, assuming use of the HTTP protocol, is of the following type:

(http://)HOSTNAME:PORT//RULESETPATH?[WSDL] [&*OPTIONS*]

An example of a URL satisfying this format could be the following:

(http://)localhost:1234/ILOGRuleExecutionService// RemoteExecutionRuleApp-/1.0/RemoteExecutionRules/1.0?wsdl In embodiments of the invention where the transparent decision service is accessed from a web browser, the endpoint address 34 can be set directly from the web browser in the WSDL request URL, such as for example:

http://HOSTNAME:PORT// RULESETPATH?endpoint=<EXECUTION-URLADDRESS>

Alternatively, in embodiments of the invention where the transparent decision service is accessed from a user interface of the type rule execution server console, the execution service address may be specified by setting a dedicated field "Execution Decision Address".

According to still another alternative, the execution service address may be specified from an execution service configuration file such as "Web.config" file or "App.config" file, using a configuration property, such as for example:

"ILOG.Rules.ExecutionServer.Execution.DecisionService.Url", which represents a property included in the configuration file specifying a default URL endpoint.

The above request type may be used by the client to deploy the rule set to the client interface (such as a console, a web browser or other application supporting the WSDL format). The deployment of the rule set generates a description file (WSDL file or HTML file).

After deploying the rule set to the user interface (console, GUI, etc.) the client can then execute the web service using the same request format. To execute the WSDL request, the client may generate the request URL according to the following example

```
http://localhost:1234/ILOGRuleExecutionService//htds/
RemoteExecution-RuleApp/1.0/RemoteExecutionRules/1.0?wsdl.
```

The Rule Execution Server 102 uses rule set execution paths identified by RULESETPATH to locate a deployed rule set container "ruleApp" and a rule set.

The rule set container "RuleApp" is a deployable management data structure that contains one or more rule sets. A rule set container "RuleApp" may comprise the following attributes:
- a rule set container name "RuleApp name";
- a rule set container version "RuleApp version";
- a rule set container number representing the number of rulesets managed by the container "RuleApp"; and
- a creation date "RuleApp creation date" representing the creation date of the rule set container.

The RULESETPATH parameter defines a path for browsing the rule metadata store 170 to select the decision service the client wants to access. The RULESETPATH parameter comprises one or more Rule set execution paths that will be used by the application Server to locate a deployed rule set container "RuleApp" and a rule set "ruleset" in this rule set container.

Each Rule set path may be defined according to the following format:
/{RuleApp name}[/{version}]/{ruleset name}[/{version}] where
  {RuleApp name} and {ruleset name} (which may include digits, letters, and underscores) respectively define the name of the rule set container "RuleApp" and the rule set "ruleset";
  /{version} identifies the version of the rule set container "RuleApp" and of the rule set "ruleset".

The version attribute is optional. If the version is not specified, it may be set by default as the latest activated version of the rule set container "RuleApp" or the rule set "ruleset". The version attribute {version} may be represented in the format "{number}.{number}".

Below are rule set paths examples for the RULESETPATH parameter of the execution service URL:

```
/rle8_8app/6_ruleset_6/1.0
/rule8_8app/1.0/6_ruleset_6
/rule8_8app/6_ruleset_6
/rule8_8app/1.0/6_ruleset_6/1.0
```

In certain embodiments of the invention, the "WSDL" parameter of the URL is not required to be specified. If it is not specified, the server 110 will provide access to the service description in another format.

The "WSDL" parameter of the URL can be used to request access to the WSDL content in the deployment phase. If the WSDL parameter is not specified, a description file or page on the user interface in human readable format (e.g. HTML) will be dynamically generated to provide access to the description of the service.

The description of the service in a HTML format may comprise technical information related to the web service and a general description identifying for example:
- the documentation associated with the rule set;
- the access to the WSDL;
- the browsable WSDL view; and
- the rule set signature.

The rule set signature is defined by rule set parameters and represents the inputs the rule set requires for execution (in and in/out parameters), and the outputs that are expected to be returned (in/out and out parameters).

The description page may be accessed from the rule execution server console, by browsing to the rule set, right-clicking the rule set and then clicking a view decision service details link by clicking a description tab. Alternatively, the description page may be accessible from a Web browser, for example by entering the URL without the WSDL option according to the URL format below:
  http://HOSTNAME:PORT//RULESETPATH?[Options]

According to another aspect of the invention, the transparent decision service unit 110 may be provided with trace functionality on the endpoint access.

In such embodiments, the URL for accessing or executing a hosted transparent decision service may comprise an endpoint parameter and/or a trace parameter as the OPTION parameter.

The ENDPOINT parameter specifies an additional URL in the OPTION section of the request such as "http://localhost:8080/RULESETPATH" for the rule set execution.

The additional URL specified by the ENDPOINT parameter may have the following default format:
  http://HOSTNAME:PORT//RULESETPATH?endpoint=ENDPOINTURL For example, ENDPOINTURL can have the value http://localhost:8080/. When such endpoint parameter is specified, it will be used to customize the port section in the WSDL file with the endpoint parameter value specified by endpoint option. Instead of generating the address based on the Rule Set Path parameter, the address specified by the endpoint option will be used. Thereby, if a load balancer or proxy is used, the Web service can be configured to point to the proxy URL rather than to the server that generates the WSDL file. The service can thus be executed without depending on the server that generated the WSDL file.

The TRACE option uses a trace parameter that can have a FALSE default value and may be set to a TRUE value to enable the execution trace functionality.

When TRACE functionality is enabled (i.e. trace parameter has an enablement value), trace data will be added to the WSDL file to launch the rule execution engine 150 in a mode where execution related events will be logged. When the rule execution is completed, a part of the web service response will contain the execution trace together with other data related to the rule execution (rules name, tasks name, input/output data, etc.).

The following example illustrates a URL for exposing a rule set with an enabled TRACE functionality:
http://localhost:1234//MyRuleApp/MyRuleset?wsdl&trace=true
This first exemplary URL defines:
the WSDL file at this URL http://localhost:1234//;
an execution of the last deployed version of the ruleset defined by the ruleset path "My RuleApp/MyRuleset"; and
an execution trace according to the filter set.
The following URL is a second example of a URL with a disabled trace functionality and an endpoint option:

http://localhost:1234//MyRuleApp/1.0/MyRuleset?wsdl&trace=false&end-point=http://localhost:8080/RULESETPATH.

This second example includes:
an endpoint address specifying the WSDL file at URL http://localhost:1234/h/;
an execution of "RuleApp MyRuleApp/1.0" and of the last deployed version of the rule set "MyRuleset";
a disablement of trace functionality as the execution trace is turned off (TRACE value is "false"); and
the rule set execution at the URL http://localhost:8080/RULESETPATH.

Figure 4:
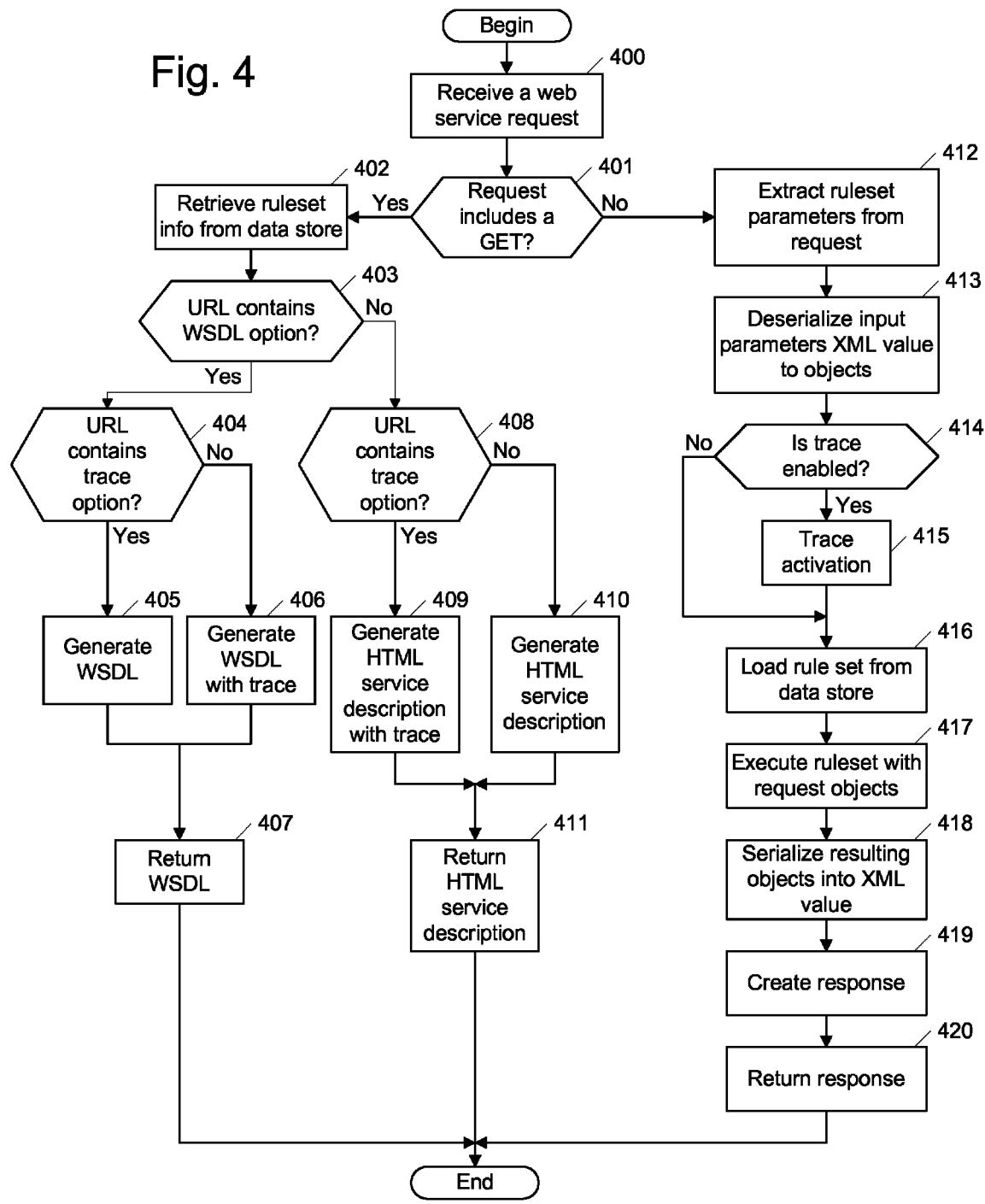
FIG. 4 shows a flowchart illustrating rule set management in accordance with the invention.

FIG. 4 shows the flowchart for processing a transparent decision service request received from a client 180, according to certain embodiments of the invention.

In step 400, the web service request is received from the client 180 in HTTP-like format. The web service request comprises a header, a body which may include a method (such as GET, POST) and an endpoint address representing the URL used to contact the server in the following format:
http://HOSTNAME:PORT//RULESETPATH?[WSDL][&*OPTIONS*]

In step 401, the request is parsed by the request router 120 to determine if the request body comprises a method of a first type, in particular a GET method. According to HTTP protocol, a GET method is used to retrieve information identified by the Request. Step 401 is performed to determine the type of web service requested by the client 180 based on the detection of a GET method.

If it is determined that the request body includes a GET method, then step 402 starts the process of dynamically generating a WSDL file to the client based on the rule set path identified in the request. The Rule set path RULESETPATH is then extracted from the endpoint address of the web service request as represented by the URL and the data corresponding to the rule set path are loaded from the rules metadata store 170.

Step 403 then checks if the web service request comprises a WSDL parameter, and if so, step 404 checks whether the web service request further comprises a TRACE parameter with an enablement value (e.g., a TRUE value).

If a TRACE parameter with no enablement value (e.g., a FALSE value) is detected in the web service request, the WSDL file is generated in step 405 from the rule data retrieved in previous step 402 and model data. Accordingly, the WSDL file is dynamically generated for the model from data stored in the rule metadata store 170 instead of being statically provided.

If a TRACE parameter with an enablement value (e.g. TRUE value) is detected in the HTTP request in step 404, the WSDL file is generated in step 406 from the rule data retrieved in previous step 402 and model data, together with additional data allowing tracing the decisions made during the execution of the decision service. The WSDL file will be generated with Trace description, in a suitable format such as an XSD format.

Exhibit E1 is an example of a WSDL file without trace information. Exhibit E2 is an example showing trace information added to a WSDL file.

In step 407, the generated WSDL file is sent back to the client 180.

The client user or program connecting to a web service will then be able to read the WSDL description to determine what operations are available on the execution server 102. Any special data types that are used are embedded in the WSDL file in the form of an XML Schema. The client will be able to use the web service request to actually call one of the operations listed in the WSDL.

If no WSDL parameter is detected in step 403, step 408 parses the web service request to determine if it includes a TRACE parameter having an enablement value similarly to step 412.

If a TRACE parameter with an enablement value (e.g., a TRUE value) is detected, step 409 generates the description of the web service in human-readable format, such as HTML format, with tracing information from the rule and model data (previous step 402). This enables the display of information on the decision service in a human readable format as an alternative to the WSDL file.

If the TRACE parameter is disabled (that is, has a FALSE value), step 410 generates the description of the web service in a human-readable format, such as HTML format, from the rule and model data.

The web service description may contains a general description (documentation associated with the rule set, access to the WSDL, a browsable WSDL view, the rule set signature, etc.) and technical information (Web service information).

In step 411, the web service description is sent back to the client 180. The client will display the information in the selected human readable format.

FIGS. 5 and 6 show portions of an exemplary web service description in human readable format.

If the request body includes a method of a second type (step 401), in particular a POST method, a rule execution process is started. In step 412, data necessary for the rule set execution (rule set parameters) are retrieved from the body of the HTTP request that uses the POST method. A POST request method is used by the client 180 to send data to the server as part of the request. The rule set parameters comprise the rule set signature representing the inputs the rule set requires for execution and the outputs that will be returned.

In step 413, the data retrieved from the request are converted into data specific to the target language. In particular, the input parameters retrieved from the request are de-serialized from XML data into objects. The target language is the language that is recognized by the rule execution engine 150.

Step 414 checks if TRACE functionality is enabled. If so, trace activation is requested to collect tracing information for the user in step 415.

In step 416, the rule set path RULESETPATH is extracted from the endpoint address of the URL included in the HTTP request and the corresponding data (rule sets) are loaded from the rule metadata store 170.

Step 417 launches the execution of the rule set corresponding to the data retrieved from the rule metadata store 170 with the request objects (deserialized input parameters) obtained in step 413.

In step 418, the resulting data obtained from the rule set execution are transformed from the execution language into the target scripting language (e.g. XML) and the output data are serialised from objects to XML data.

In step 419, the request response is created using the web service protocol, e.g. SOAP, and the result is sent back to the client in step 420.

The transparent decision service system 100 in accordance with embodiments of the invention allows a user to construct code to invoke the rule set execution by dynamically and transparently generating the web service description file. It can also provide access to the web service description in a human readable format. When generating the web service description, the user can transparently enable rule execution tracing or endpoint change. The user can then call the execution of rule sets, thereby dynamically generating the corresponding code in any suitable language (Java, .Net or any tool supporting WSDL format).

The URL used to access each service (WSDL file, HTML web service description and rule execution) is hosted by the same application. Each service is dispatched according to the URL path, options, and body methods (GET, POST . . . ).

This accordingly provides a web service over a rule management system that exposes a runtime service description (WSDL). The invention makes it possible to generate the WSDL file dynamically at runtime. The WSDL files are dynamically generated without any compilation to apply on the rule management system. The web service provided according to the invention may be constructed over any existing rule management system.

The invention can take the form of an entirely hardware embodiment, an entirely software embodiment or an embodiment containing both hardware and software elements. In particular it will be appreciated that while FIGS. 1 and 2 are presented in the form of hardware, exactly equivalent effects could be achieved in software. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The preceding description of preferred embodiments of the invention has been presented for the purposes of illustration. The description provided is not intended to limit the invention to the particular forms disclosed or described. Modifications and variations will be readily apparent from the preceding description. For example, although the description of the preferred embodiments of the invention has been made with reference to a web service request comprising only a trace option and/or an endpoint option, the skilled person will readily understand that other options could be supported such as a protocol option specifying the protocol that should be used for invoking the execution. As a result, it is intended that the scope of the invention not be limited by the detailed description provided herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exhibit E1

E11—Part Representing the Request Part

```
<xsd:element name="DecisionServiceRequest">
        <xsd:complexType>
            <xsd:sequence>
                <xsd:element ref="param:requestParam"/>
            </xsd:sequence>
        </xsd:complexType>
    </xsd:element>
```

E12—Part Representing the Response Part:

```
<xsd:element name="DecisionServiceResponse">
        <xsd:complexType>
            <xsd:sequence>
                <xsd:element name="ilog.rules.outputString"
                    type="xsd:string"/>
                <xsd:element name="ilog.rules.-
                    firedRulesCount" type="xsd:int"/>
                <xsd:element ref="param:resultParam"/>
            </xsd:sequence>
        </xsd:complexType>
    </xsd:element>
```

E13—Part Representing the Error Part:

```
<xsd:element name="DecisionServiceException">
    <xsd:complexType>
        <xsd:sequence>
            <xsd:element maxOccurs="1" minOccurs="1" name="exception" nillable="false" type="xsd:string"/>
        </xsd:sequence>
    </xsd:complexType>
</xsd:element>
</xsd:schema>
```

E14—Part Dynamically Generated Representing the Rule Set Definition.

```
<xsd:schemamin        targetNamespace="http://www.ilog.com/rules/param"
xmlns:ns0="http://www.ilog.com/rules/param "
xmlns:ns1="http://.ilog.com/rules/DecisionService/DefaultNs ">
        <xsd:import namespace="http://www.ilog.com/
            rules/DecisionService/DefaultNs"/ >
```

E15—Part Representing the Request Parameter Schema Element Depending of the Execution Object Model Store.

```
<xsd:element name="requestParam">
    <xsd:complexType>
        <xsd:sequence>
            <xsd:element ref="ns1:request-for-quote"/>
        </xsd:sequence>
    </xsd:complexType>
</xsd:element>
```

E16—Part Representing the Response Parameter Schema Element Depending on the Execution Object Model Store.

```
<xsd:element name="resultParam">
    <xsd:complexType>
        <xsd:sequence>
            <xsd:element ref="ns1:quote"/>
        </xsd:sequence>
    </xsd:complexType>
</xsd:element>
</xsd:schema>
```

E17—Part Representing the WSDL Port Type-the Port Name May be Dynamically Generated Based on the Rule Set Path

```
<wsdl:portType name=
"DecisionServiceXsdWithoutNamespaceIncludeAll">
    <wsdl:operation name="executeDecisionService">
        <wsdl:input message="tns:DecisionServiceSoapRequest">
```

-continued

```
        </wsdl:input>
        <wsdl:output message=
            "tns:DecisionServiceSoapResponse">
        </wsdl:output>
        <wsdl:fault name="DecisionServiceSoapFault" message=
            "tns:DecisionServiceSoapFault">
        </wsdl:fault>
    </wsdl:operation>
</wsdl:portType>
...
```

E18—Part Representing the WSDL Binding Type-the Binding Name is Dynamically Generated Based on the Rule Set Path

```
<wsdl:binding name="DecisionServiceSOAP" type=
"tns:DecisionServiceType">
    <soap:binding transport="http://schemas.xmlsoap.org/soap/http"/>
    <wsdl:operation name="ExecuteDecisionService">
    <wsdl:documentation>This ruleset validates and then computes the
eligibility for a given loan requested by a given
borrower.</wsdl:documentation>
    <soap:operation soapAction="ExecuteDecisionService"
        style="document"/>
    <wsdl:input>
        <soap:body use="literal"/>
    </wsdl:input>
    <wsdl:output>
        <soap:body use="literal"/>
    </wsdl:output>
    <wsdl:fault name="DecisionServiceSoapFault">
        <soap:fault use="literal" name="DecisionServiceSoapFault"
        namespace=""/>
    </wsdl:fault>
    </wsdl:operation>
</wsdl:binding>
...
```

E19—Part Representing the WSDL Service Element (the Service Name is Dynamically Generated Based on the Rule Set Path)

```
<wsdl:service name="DecisionServiceType">
    <wsdl:documentation>This ruleset validates and then computes the
eligibility for a given loan requested by a given
borrower.</wsdl:documentation>
    <wsdl:port name="DecisionServiceSOAPlocalhost"
        binding="tns:DecisionServiceSOAP">
        <soap:address location="http://parrules04-
2k8.ilog.biz:1234/ILOGRuleExecutionService/htdsservice.svc/htds/
MiniLoanTestingRuleApp/1.0/MiniLoanTesting
Rules/1.0"/>
    </wsdl:port>
</wsdl:service>
</wsdl:definitions>
```

Exhibit E2—WSDL with Tracing Information

```
...
TargetNamespace="http://www.ilog.com/rules/Trace" xmlns:xs="http://www.w3.org/2001/XMLSchema"
xmlns:tns="http://www.ilog.com/rules/Trace">
    <xs:element name="ILOG.Rules.TraceFilter" nillable="true" type="tns:TraceFilter"/>
    <xs:complexType name="TraceFilter">
      <xs:sequence>
        <xs:element minOccurs="1" maxOccurs="1" default="true" name="TotalExecutedRules" type="xs:boolean">
            <xs:annotation>
                <xs:documentation>Records the number of rules executed.</xs:documentation>
            </xs:annotation>
        </xs:element>
        <xs:element minOccurs="1" maxOccurs="1" default="true" name="TotalExecutedTasks" type="xs:boolean">
            <xs:annotation>
                <xs:documentation>Records the number of tasks executed should be recorded.</xs:documentation>
```

```
    </xs:annotation>
  </xs:element>
  <xs:element minOccurs="1" maxOccurs="1" default="true" name="ExecutedRules" type="xs:boolean">
    <xs:annotation>
      <xs:documentation>Records what rules have been executed.</xs:documentation>
    </xs:annotation>
  </xs:element>
  <xs:element minOccurs="1" maxOccurs="1" default="true" name="ExecutedTasks" type="xs:boolean">
    <xs:annotation>
      <xs:documentation>Records what tasks have been executed.</xs:documentation>
    </xs:annotation>
  </xs:element>
  <xs:element minOccurs="1" maxOccurs="1" name="TotalNotExecutedRules" type="xs:boolean">
    <xs:annotation>
      <xs:documentation>Records the number of rules that have not been executed.</xs:documentation>
    </xs:annotation>
  </xs:element>
  <xs:element minOccurs="1" maxOccurs="1" name="TotalNotExecutedTasks" type="xs:boolean">
    <xs:annotation>
      <xs:documentation>Records the number of tasks that have not been executed.</xs:documentation>
    </xs:annotation>
  </xs:element>
  <xs:element minOccurs="1" maxOccurs="1" name="NotExecutedRules" type="xs:boolean">
    <xs:annotation>
      <xs:documentation>Records what rules that have not been executed.</xs:documentation>
    </xs:annotation>
  </xs:element>
  <xs:element minOccurs="1" maxOccurs="1" name="NotExecutedTasks" type="xs:boolean">
    <xs:annotation>
      <xs:documentation>Records what tasks that have not been executed.</xs:documentation>
    </xs:annotation>
  </xs:element>
  <xs:element minOccurs="1" maxOccurs="1" name="ExecutionDuration" type="xs:boolean">
    <xs:annotation>
      <xs:documentation>Records the duration of the execution.</xs:documentation>
    </xs:annotation>
  </xs: element>
  <xs:element minOccurs="1" maxOccurs="1" name="WorkingMemory" type="xs:boolean">
    <xs:annotation>
      <xs:documentation>Records the state of the working memory.</xs:documentation>
    </xs:annotation>
  </xs:element>
  <xs:element minOccurs="1" maxOccurs="1" name="InputParameters" type="xs:boolean">
    <xs:annotation>
      <xs:documentation>Records ruleset input parameters.</xs:documentation>
    </xs:annotation>
  </xs:element>
  <xs:element minOccurs="1" maxOccurs="1" name="OutputParameters" type="xs:boolean">
    <xs:annotation>
      <xs:documentation>Records ruleset output parameters.</xs:documentation>
    </xs:annotation>
  </xs:element>
  <xs:element minOccurs="1" maxOccurs="1" name="OutputString" type="xs:boolean">
    <xs:annotation>
      <xs:documentation>Records the output string.</xs:documentation>
    </xs:annotation>
  </xs:element>
  <xs:element minOccurs="1" maxOccurs="1" name="MatchedObjects" type="xs:boolean">
    <xs:annotation>
      <xs:documentation>Records the list of matched objects.</xs:documentation>
    </xs:annotation>
  </xs:element>
  <xs:element minOccurs="1" maxOccurs="1" name="Rules" type="xs:boolean">
    <xs:annotation>
      <xs:documentation>Records the complete list of rules in the executed ruleset.</xs:documentation>
    </xs:annotation>
  </xs:element>
  <xs:element minOccurs="1" maxOccurs="1" name="Tasks" type="xs:boolean">
    <xs:annotation>
      <xs:documentation>Records the complete list of tasks in the executed ruleset.</xs:documentation>
    </xs:annotation>
  </xs:element>
  <xs:element minOccurs="1" maxOccurs="1" name="ExecutionServerInfo" type="xs:boolean">
    <xs:annotation>
      <xs:documentation>Records static data about the execution server, such as its location.</xs:documentation>
    </xs:annotation>
  </xs:element>
  <xs:element minOccurs="1" maxOccurs="1" default="true" name="RuleSetPath" type="xs:boolean">
```

```
<xs:annotation>
  <xs:documentation>Records the canonical ruleset path.</xs:documentation>
</xs:annotation>
</xs:element>
<xs:element minOccurs="1" maxOccurs="1" name="All" type="xs:boolean">
<xs:annotation>
....
```

What is claimed is:

1. A method for managing rule sets based on a given model, comprising:
receiving, from a client, a web service request, the web service request including:
a body, and
an endpoint address including a service description parameter and a rule set path parameter;
parsing the web service request to determine whether the body indicates a first type of method;
dynamically generating, upon the body indicating the first type of method, a service description file, wherein
the body is configured to indicate multiple types of methods,
the rule set path parameter identifies a path to a given rule set in a rule set database,
the service description file is formatted based upon the service description parameter, and
the service description file is generated based upon
the rule set path parameter,
information maintained in the rule set database, and
model data related to the given model.

2. The method of claim 1, wherein
the service description file is generated as a WSDL file upon the service description parameter identifying a WSDL format.

3. The method of claim 1, further comprising
receiving, from the client, a second web service request;
parsing the second web service request to determine whether a body of the second web service request indicates a second type of method;
executing, upon the body of the second web service request indicating the second type of method, a rule set identified by a rule set path parameter within the second web service request.

4. The method of claim 3, wherein
the second web service request includes a trace parameter, and
the executing includes tracing execution of rule sets upon the trace parameter having an enablement value.

5. The method of claim 3, wherein
an endpoint address of the second web service request includes an endpoint parameter specifying an additional URL for rule execution.

6. The method of claim 3, wherein
the first type of method is a GET method, and
the second type of method is a POST method.

7. A computer hardware system configured to manage rule sets based on a given model, comprising:
at least one processor configured to initiate and/or perform:
receiving, from a client, a web service request, the web service request including:
a body, and
an endpoint address including a service description parameter and a rule set path parameter;
parsing the web service request to determine whether the body indicates a first type of method;
dynamically generating, upon the body indicating the first type of method, a service description file, wherein
the body is configured to indicate multiple types of methods,
the rule set path parameter identifies a path to a given rule set in a rule set database,
the service description file is formatted based upon the service description parameter, and
the service description file is generated based upon
the rule set path parameter,
information maintained in the rule set database, and
model data related to the given model.

8. The system of claim 7, wherein
the service description file is generated as a WSDL file upon the service description parameter identifying a WSDL format.

9. The system of claim 7, wherein the at least one processor is further configured to initiate and/or perform:
receiving, from the client, a second web service request;
parsing the second web service request to determine whether a body of the second web service request indicates a second type of method;
executing, upon the body of the second web service request indicating the second type of method, a rule set identified by a rule set path parameter within the second web service request.

10. The system of claim 9, wherein
the second web service request includes a trace parameter, and
the executing includes tracing execution of rule sets upon the trace parameter having an enablement value.

11. The system of claim 9, wherein
an endpoint address of the second web service request includes an endpoint parameter specifying an additional URL for rule execution.

12. The system of claim 8, wherein
the first type of method is a GET method, and
the second type of method is a POST method.

13. A computer program product, comprising:
a computer usable storage device having stored therein computer usable program code for managing rule sets based on a given model, the computer usable program code, which when executed on a computer hardware system, causes the computer hardware system to perform:
receiving, from a client, a web service request, the web service request including:
a body, and
an endpoint address including a service description parameter and a rule set path parameter;
parsing the web service request to determine whether the body indicates a first type of method;
dynamically generating, upon the body indicating the first type of method, a service description file, wherein
the body is configured to indicate multiple types of methods, the rule set path parameter identifies a path to a given rule set in a rule set database,
the service description file is formatted based upon the service description parameter, and
the service description file is generated based upon the rule set path parameter,
information maintained in the rule set database, and
model data related to the given model.

14. The computer program product of claim 13, wherein the service description file is generated as a WSDL file upon the service description parameter identifying a WSDL format.

15. The computer program product of claim 13, wherein the computer usable program code further causes the computer hardware system to perform:
receiving, from the client, a second web service request;
parsing the second web service request to determine whether a body of the second web service request indicates a second type of method;
executing, upon the body of the second web service request indicating the second type of method, a rule set identified by a rule set path parameter within the second web service request.

16. The computer program product of claim 15, wherein the second web service request includes a trace parameter, and
the executing includes tracing execution of rule sets upon the trace parameter having an enablement value.

17. The computer program product of claim 15, wherein an endpoint address of the second web service request includes an endpoint parameter specifying an additional URL for rule execution.

18. The computer program product of claim 15, wherein the first type of method is a GET method, and
the second type of method is a POST method.

* * * * *